US012737141B2

(12) United States Patent
Malkevich et al.

(10) Patent No.: US 12,737,141 B2
(45) Date of Patent: Sep. 15, 2026

(54) EFFICIENT HANDLING OF STORAGE OBJECTS HAVING ASSOCIATED EXPIRATION TIMES

(71) Applicant: Dell Products L.P., Round Rock, TX (US)

(72) Inventors: Evgeny Malkevich, Newton, MA (US); Fangyuan Cui, Westford, MA (US); Saoni Mukherjee, Milford, MA (US); Ryan Lesko, Waltham, MA (US); George Tucker Gettel, Merrimack, NH (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/061,262

(22) Filed: Feb. 24, 2025

(65) Prior Publication Data

US 2026/0252268 A1 Aug. 27, 2026

(51) Int. Cl.
*G06F 3/06* (2006.01)

(52) U.S. Cl.
CPC .......... *G06F 3/0659* (2013.01); *G06F 3/0619* (2013.01); *G06F 3/067* (2013.01)

(58) Field of Classification Search
None
See application file for complete search history.

(56) References Cited

U.S. PATENT DOCUMENTS 5,577,237 A * 11/1996 Lin .......................... G06F 1/14 713/500
6,396,843 B1 * 5/2002 Chiussi ................ H04L 47/568 370/418
6,647,505 B1 * 11/2003 Dangi ...................... G06F 1/14 713/502
8,307,030 B1 11/2012 Hu
2003/0154328 A1 * 8/2003 Henderson ............. H04L 47/32 710/1

(Continued)

OTHER PUBLICATIONS

A. Lev-Libfeld, "Timer Lawn: Unbound Low Latency Timer Data Structure for Large Scale, High Throughput Systems," arXiv: 1906.10860v2, Jul. 15, 2019, 4 pages.

(Continued)

*Primary Examiner* — Kaushikkumar M Patel
(74) *Attorney, Agent, or Firm* — Ryan, Mason & Lewis, LLP

(57) ABSTRACT

An apparatus in an illustrative embodiment comprises at least one processing device configured to maintain a cyclic array of storage object queues each associated with one of a set of two or more different time intervals. The at least one processing device is also configured to identify a storage object having an associated expiration time and to select, for the identified storage object, one of the storage object queues in the cyclic array based at least in part on its associated expiration time. The at least one processing device is further configured to insert the identified storage object into the selected storage object queue, and to process, in response to a designated timer trigger event corresponding to expiration of a given one of the time intervals, storage objects in a given one of the storage object queues in the cyclic array associated with the given time interval.

20 Claims, 8 Drawing Sheets

(56) References Cited

U.S. PATENT DOCUMENTS

| | | | | |
|---|---|---|---|---|
| 2007/0022192 | A1* | 1/2007 | Nguyen | H04L 41/0681<br>709/224 |
| 2007/0162646 | A1* | 7/2007 | Maitland | G06F 13/28<br>710/22 |
| 2008/0013450 | A1* | 1/2008 | Worley | G06F 16/2477<br>370/230 |
| 2023/0079621 | A1* | 3/2023 | Gupta | G06F 16/1748<br>707/664 |
| 2024/0283747 | A1* | 8/2024 | Sawabe | H04L 43/087 |

OTHER PUBLICATIONS

U.S. Appl. No. 18/650,828 entitled "Efficient Timer Mechanism for Multi-Threaded Systems"; filed Apr. 30, 2024.

* cited by examiner

EFFICIENT HANDLING OF STORAGE OBJECTS HAVING ASSOCIATED EXPIRATION TIMES

BACKGROUND

Information processing systems often include distributed storage systems comprising multiple storage nodes. These distributed storage systems may be dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. For applications running on a host that utilizes the software-defined storage system, such a storage system provides a logical storage object view to allow a given application to store and access data, without the application being aware that the data is being dynamically distributed among different storage nodes.

SUMMARY

Illustrative embodiments disclosed herein provide techniques for efficient handling of storage objects having associated expiration times.

In one embodiment, an apparatus comprises at least one processing device comprising a processor coupled to a memory. The at least one processing device is configured to maintain a cyclic array of storage object queues, each storage object queue in the cyclic array being associated with one of a set of two or more different time intervals. The at least one processing device is also configured to identify a storage object having an associated expiration time and to select, for the identified storage object, one of the storage object queues in the cyclic array based at least in part on the expiration time associated with the identified storage object. The at least one processing device is further configured to insert the identified storage object into the selected storage object queue, and to process, in response to a designated timer trigger event corresponding to expiration of a given one of the set of two or more different time intervals, storage objects in a given one of the storage object queues in the cyclic array associated with the given time interval.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
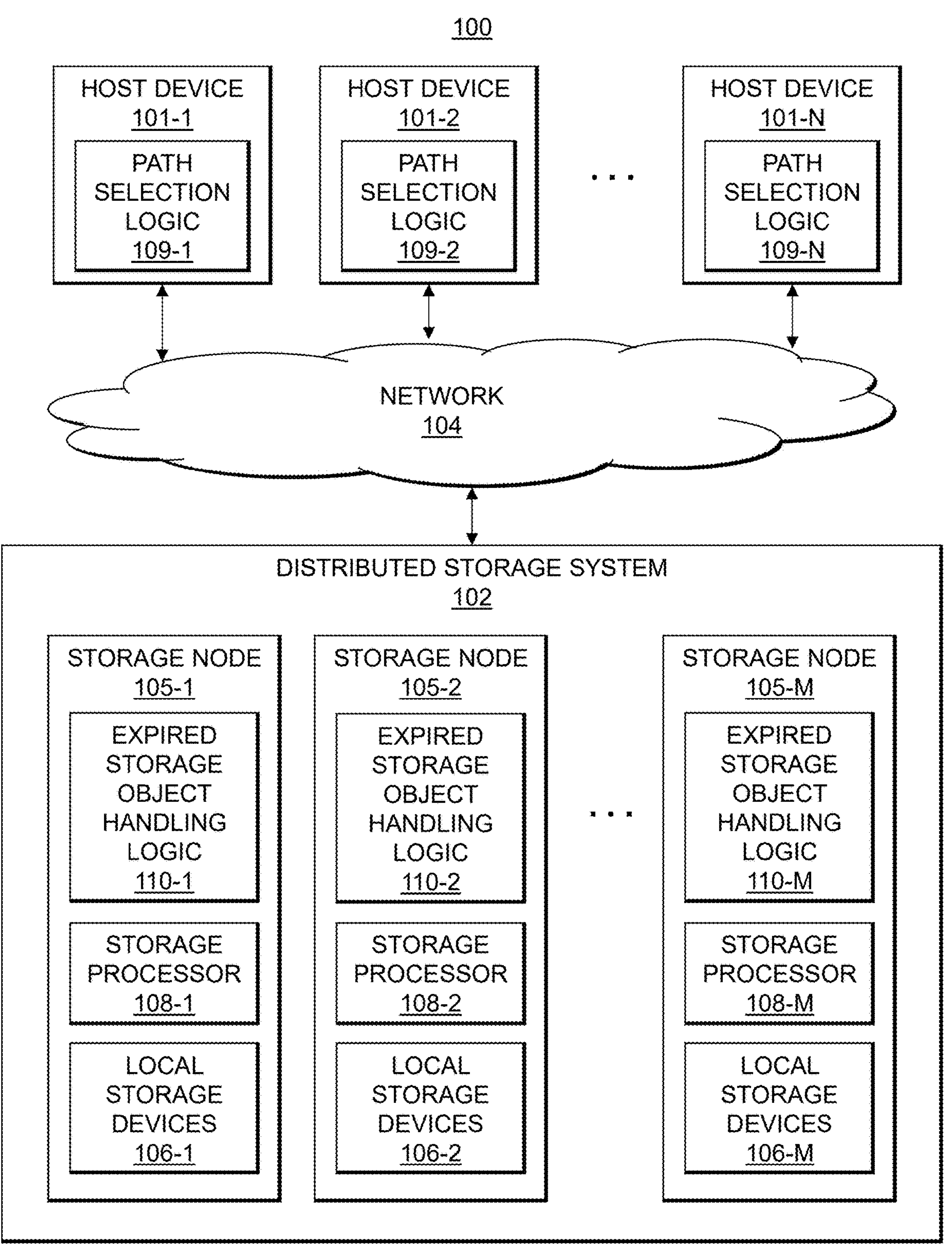
FIG. 1 is a block diagram of an information processing system that includes a distributed storage system configured for efficient handling of storage objects having associated expiration times in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as hosts 101, and a distributed storage system 102 shared by the hosts 101. The hosts 101 and distributed storage system 102 in this embodiment are configured to communicate with one another via a network 104 that illustratively utilizes protocols such as Transmission Control Protocol (TCP) and Internet Protocol (IP), and is therefore referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics.

It should be noted that the term "host" as used herein is intended to be broadly construed, so as to encompass, for example, a host device or a host system, each of which may comprise multiple distinct devices of various types. A host in some embodiments can comprise, for example, at least one server, as well as additional or alternative types and arrangements of processing devices.

The distributed storage system 102 more particularly comprises a plurality of storage nodes 105-1, 105-2, . . . 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the distributed storage system 102, which is just one possible example of what is generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the distributed storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space. For a given logical storage volume, logical blocks of that logical storage volume are illustratively distributed across the storage nodes 105.

Other types of distributed storage systems can be used in other embodiments. For example, distributed storage system 102 can comprise multiple distinct storage arrays, such as a production storage array and a backup storage array, possibly deployed at different locations. Accordingly, in some embodiments, one or more of the storage nodes 105 may each be viewed as comprising at least a portion of a separate storage array with its own logical address space. Alternatively, the storage nodes 105 can be viewed as collectively comprising one or more storage arrays. The term "storage node" as used herein is therefore intended to be broadly construed.

In some embodiments, the distributed storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments.

In some embodiments, SDS server nodes are configured at least in part as respective PowerFlex® software-defined storage nodes from Dell Technologies, suitably modified as disclosed herein to implement efficient timer mechanisms, although other types of storage nodes can be used in other embodiments.

As will be described in more detail elsewhere herein, the storage nodes 105 of the distributed storage system 102 each comprise one or more processing devices, with at least one of the processing devices implementing functionality for efficient handling of storage objects having associated expiration times utilizing the expired storage object handling logic 110. In some embodiments, each of the processing devices comprises one or more multi-threaded processing cores, and with at least one of the processing cores implementing at least a portion of the expired storage object handling logic 110.

It is to be appreciated, however, that the functionality for efficient handling of storage objects having associated expiration times as disclosed herein can be implemented in other embodiments in stand-alone storage arrays or other types of storage systems that are not distributed across multiple storage nodes, as well as in numerous other multi-threaded systems. The disclosed techniques are therefore applicable to a wide variety of different types of storage systems. The distributed storage system 102 is just one illustrative example.

In the distributed storage system 102, each of the storage nodes 105 is illustratively configured to interact with one or more of the hosts 101. The hosts 101 illustratively comprise servers or other types of computers of an enterprise computer system, cloud-based computer system or other arrangement of multiple compute nodes, each associated with one or more system users.

The hosts 101 in some embodiments illustratively provide compute services such as execution of one or more applications on behalf of each of one or more users associated with respective ones of the hosts 101. Such applications illustratively generate input-output (IO) operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are currently being processed in the distributed storage system 102 in some embodiments are referred to herein as outstanding IOs that have been admitted by the storage nodes 105 to further processing within the system 100. The storage nodes 105 are illustratively configured to queue IO operations arriving from one or more of the hosts 101 in one or more sets of IO queues. In some embodiments, each of the storage nodes 105 comprises one or more non-volatile memory express (NVMe) targets or other types of targets of the distributed storage system 102, and each such target is configured with a plurality of IO queues. Each such IO queue may have a corresponding TCP connection or other type of network connection with one or more of the hosts 101.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms. In the case of separate processing platforms, there may be a single storage node per processing platform or multiple storage nodes per processing platform.

The hosts 101 are illustratively configured to write data to and read data from the distributed storage system 102 comprising storage nodes 105 in accordance with applications executing on those hosts 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise. Combinations of cloud and edge infrastructure can also be used in implementing a given information processing system to provide services to users.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than network 104 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) interface cards of those devices, that support networking protocols such as InfiniBand or Fibre Channel, in addition to or in place of TCP/IP. Numerous alternative networking arrangements are possible in a given embodiment, as will be appreciated by those skilled in the art. Additional examples include remote direct memory access (RDMA) over Converged Ethernet (RoCE) or RDMA over iWARP.

The first storage node 105-1 comprises a plurality of storage devices 106-1 and an associated storage processor 108-1. The storage devices 106-1 illustratively store metadata pages and user data pages associated with one or more storage volumes of the distributed storage system 102. The storage volumes illustratively comprise respective logical units (LUNs) or other types of logical storage volumes (e.g., NVMe namespaces). The storage devices 106-1 in some embodiments more particularly comprise local persistent storage devices of the first storage node 105-1. Such persistent storage devices are local to the first storage node 105-1, but remote from the second storage node 105-2, the storage node 105-M and any other ones of other storage nodes 105. The first storage node 105-1, utilizing its associated storage processor 108-1, implements expired storage object handling logic 110-1 configured for efficient handling of storage objects having associated expiration times.

Each of the other storage nodes 105-2 through 105-M is assumed to be configured in a manner similar to that described above for the first storage node 105-1. Accordingly, by way of example, storage node 105-2 comprises a plurality of storage devices 106-2 and an associated storage processor 108-2 implementing expired storage object handling logic 110-2, and storage node 105-M comprises a plurality of storage devices 106-M and an associated storage processor 108-M implementing expired storage object handling logic 110-M.

As indicated previously, the storage devices 106-2 through 106-M illustratively store metadata pages and user data pages associated with one or more storage volumes of the distributed storage system 102, such as the above-noted LUNs or other types of logical storage volumes. The storage devices 106-2 in some embodiments more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M in some embodiments more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node.

The storage processors 108 of the storage nodes 105 implement instances of the expired storage object handling logic 110. The expired storage object handling logic 110 is configured to maintain, for the distributed storage system, a cyclic array of storage object queues. Each storage object queue in the cyclic array is associated with one of a set of two or more different time intervals (e.g., consecutive time intervals from a current time to a designated future time). The expired storage object handling logic 110 is configured to perform operations for inserting and removing storage objects with associated expiration times from the storage object queues of the cyclic array. For example, when a storage object having an associated expiration time is identified, one of the storage object queues in the cyclic array is identified based on the expiration time associated with the identified storage object. The identified storage object is then inserted into the selected one of the storage object queues in the cyclic array (e.g., by adding a new node to a plurality of nodes of a bidirectional linked list of the selected storage object queue, the new node referencing the identified storage object and previous and next nodes in the bidirectional linked list). The expired storage object handling logic 110 is configured, in response to designated timer trigger events corresponding to expiration of the time intervals in the set of two or more different time intervals, to process storage objects in those storage object queues associated with the expired time intervals. The expired storage object handling logic 110, responsive to processing the storage objects in a given one of the expired time intervals, will update a given storage object queue associated with the given expired time interval to a new time interval (e.g., further out in time relative to a most distant one of the set of time intervals).

The storage processors 108 of the storage nodes 105 may include additional modules, logic and other components typically found in conventional implementations of storage processors and storage systems, although such additional modules, logic and other components are omitted from the figure for clarity and simplicity of illustration.

Additionally or alternatively, the storage processors 108 in some embodiments can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations.

Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include, for example, non-volatile random access memory (NVRAM), phase-change RAM (PC-RAM), magnetic RAM (MRAM), resistive RAM, and spin torque transfer magneto-resistive RAM (STT-MRAM). These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices that may be used to implement at least a portion of the storage devices 106 of the storage nodes 105 of the distributed storage system of FIG. 1.

In some embodiments, the storage nodes 105 collectively provide a distributed storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the hosts 101 and the storage nodes 105 comprise NVMe commands of an NVMe storage access protocol, for example, as described in the NVMe Specification, Revision 2.0c, October 2022, which is incorporated by reference herein. Other examples of NVMe storage access protocols that may be utilized in illustrative embodiments disclosed herein include NVMe over Fabrics, also referred to herein as NVMe-OF, and NVMe over TCP, also referred to herein as NVMe/TCP. Other embodiments can utilize other types of storage access protocols. As another example, communications between the hosts 101 and the storage nodes 105 in some embodiments can comprise Small Computer System Interface (SCSI) commands and the Internet SCSI (iSCSI) protocol.

Other types of commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other types, formats and configurations of IO operations can be used in other embodiments, as that term is broadly used herein.

Some embodiments disclosed herein are configured to utilize one or more RAID arrangements to store data across the storage devices 106 in each of one or more of the storage nodes 105 of the distributed storage system 102. Other embodiments can utilize other data protection techniques, such as, for example, Erasure Coding (EC), instead of one or more RAID arrangements.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage processors 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes a plurality of devices, each illustratively a different physical storage device of the storage devices 106. Multiple such physical storage devices are typically utilized to store data of a given LUN or other logical storage volume in the distributed storage system. For example, data pages or other data blocks of a given LUN or other logical storage volume can be "striped" along with its corresponding parity information across multiple ones of the devices in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the devices to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the devices to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 106 of the storage nodes 105 without using RAID arrangements.

In some embodiments, the storage nodes 105 of the distributed storage system of FIG. 1 are connected to each other in a full mesh network, and are collectively managed by a system manager. A given set of local persistent storage devices or other storage devices 106 on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The system 100 of FIG. 1 can include additional components not explicitly shown in the figure, such as one or more system management nodes that are illustratively configured to provide system management functionality of the type noted above. Such functionality may further involve utilization of control plane servers and a system management database. In some embodiments, at least portions of the system management nodes and their associated control plane servers are distributed over the storage nodes 105. For example, a designated subset of the storage nodes 105 can each be configured to include a corresponding one of the control plane servers. Other system management functionality provided by system management nodes can be similarly distributed over a subset of the storage nodes 105.

The system management database stores configuration and operation information of the system 100 and portions thereof are illustratively accessible to various system administrators such as host administrators and storage administrators.

The hosts 101-1, 101-2, . . . 101-N include respective instances of path selection logic 109-1, 109-2, . . . 109-N. In some embodiments, each of the storage nodes 105 of the distributed storage system 102 is assumed to comprise multiple controllers associated with a corresponding target of that storage node. Such a "target" as that term is broadly used herein is illustratively a destination end of one or more paths from one or more of the hosts 101 to the storage node, and may comprise, for example, an NVMe subsystem of the storage node, although other types of targets can be used in other embodiments. It should be noted that different types of targets may be present in NVMe embodiments than are present in other embodiments that use other storage access protocols, such as SCSI embodiments. Accordingly, the types of targets that may be implemented in a given embodiment can vary depending upon the particular storage access protocol being utilized in that embodiment, and/or other factors. Similarly, the types of initiators can vary depending upon the particular storage access protocol, and/or other factors. Again, terms such as "initiator" and "target" as used herein are intended to be broadly construed, and should not be viewed as being limited in any way to particular types of components associated with any particular storage access protocol.

The paths that are selected by instances of path selection logic 109 of the hosts 101 for delivering IO operations from the hosts 101 to the distributed storage system 102 are associated with respective initiator-target pairs.

In some embodiments, IO operations are processed in the hosts 101 utilizing their respective instances of path selection logic 109 in the following manner. A given one of the hosts 101 establishes a plurality of paths between at least one initiator of the given host and a plurality of targets of respective storage nodes 105 of the distributed storage system 102. For each of a plurality of IO operations generated in the given host for delivery to the distributed storage system 102, the host selects a path to a particular target, and sends the IO operation to the corresponding storage node over the selected path.

The given host above is an example of what is more generally referred to herein as "at least one processing device" that includes a processor coupled to a memory. The storage nodes 105 of the distributed storage system 102 are also examples of "at least one processing device" as that term is broadly used herein.

It is to be appreciated that path selection as disclosed herein can be performed independently by each of the hosts 101, illustratively utilizing their respective instances of path selection logic 109, as indicated above, with possible involvement of additional or alternative system components.

In some embodiments, the initiator of the given host and the targets of the respective storage nodes 105 are configured to support one or more designated standard storage access protocols, such as an NVMe access protocol or a SCSI access protocol. As more particular examples in the NVMe context, the designated storage access protocol may comprise an NVMe/FC or NVMe/TCP access protocol, although a wide variety of additional or alternative storage access protocols can be used in other embodiments.

The hosts 101 can comprise additional or alternative components. For example, in some embodiments, the hosts 101 further comprise respective sets of IO queues and respective multi-path input-output (MPIO) drivers. The MPIO drivers collectively comprise a multi-path layer of the hosts 101. Path selection functionality for delivery of IO operations from the hosts 101 to the distributed storage system 102 is provided in the multi-path layer by respective instances of path selection logic implemented within the MPIO drivers. In some embodiments, the instances of path selection logic 109 are implemented at least in part within the MPIO drivers of the hosts 101.

The MPIO drivers may comprise, for example, PowerPath® drivers from Dell Technologies. Other types of MPIO drivers from other driver vendors may additionally or alternatively be used.

For example, the instances of path selection logic 109 of the respective hosts 101 can be implemented at least in part in respective MPIO drivers of those hosts.

The MPIO drivers are illustratively configured to deliver IO operations selected from respective sets of IO queues to the distributed storage system 102 via selected ones of multiple paths over the network 104. The sources of the IO operations stored in the sets of IO queues illustratively include respective processes of one or more applications executing on the hosts 101. For example, IO operations can be generated by each of multiple processes of a database application running on one or more of the hosts 101. Such processes issue IO operations for delivery to the distributed storage system 102 over the network 104. Other types of sources of IO operations may be present in a given implementation of system 100.

A given IO operation is therefore illustratively generated by a process of an application running on a given one of the hosts 101, and is queued in one of the IO queues of the given host with other operations generated by other processes of that application, and possibly other processes of other applications.

The paths from the given host to the distributed storage system 102 illustratively comprise paths associated with respective initiator-target pairs, with each initiator comprising, for example, a port of a single-port or multi-port host bus adaptor (HBA) or other initiating entity of the given host and each target comprising a port or other targeted entity corresponding to one or more of the storage devices 106 of the distributed storage system 102. As noted above, the storage devices 106 illustratively comprise LUNs or other types of logical storage devices.

Various scheduling algorithms, load balancing algorithms and/or other types of algorithms can be utilized by the MPIO driver of the given host in delivering IO operations from the IO queues of that host to the distributed storage system 102 over particular paths via the network 104. Each such IO operation is assumed to comprise one or more commands for instructing the distributed storage system 102 to perform particular types of storage-related functions such as reading data from or writing data to particular logical volumes of the distributed storage system 102. Such commands are assumed to have various payload sizes associated therewith, and the payload associated with a given command is referred to herein as its "command payload."

A command directed by the given host to the distributed storage system 102 is considered an "outstanding" command until such time as its execution is completed in the viewpoint of the given host, at which time it is considered a "completed" command. The commands illustratively comprise respective NVMe commands, although other command formats, such as SCSI command formats, can be used in other embodiments. In the SCSI context, a given such command is illustratively defined by a corresponding command descriptor block (CDB) or similar format construct. The given command can have multiple blocks of payload associated therewith, such as a particular number of 512-byte SCSI blocks or other types of blocks. Other command formats, e.g., Submission Queue Entry (SQE), are utilized in the NVMe context.

As indicated previously, the storage nodes 105 of the distributed storage system 102 process IO operations from one or more hosts 101 and in processing those IO operations run various storage application processes that generally involve interaction of that storage node with one or more other ones of the storage nodes.

In the FIG. 1 embodiment, the distributed storage system 102 comprises storage processors 108 and corresponding sets of storage devices 106, and may include additional or alternative components, such as sets of local caches.

The storage processors 108 illustratively control the processing of IO operations received in the distributed storage system 102 from the hosts 101. For example, the storage processors 108 illustratively manage the processing of read and write commands directed by the MPIO drivers of the hosts 101 to particular ones of the storage devices 106. The storage processors 108 can be implemented as respective storage controllers, directors or other storage system components configured to control storage system operations relating to processing of IO operations. In some embodiments, each of the storage processors 108 has a different one of the above-noted local caches associated therewith, although numerous alternative arrangements are possible.

In some embodiments, the storage nodes 105 are implemented using processing modules that are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in the full mesh network, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication links may be established between the various processing modules of the storage nodes using well-known communication protocols such as TCP/IP and ROCE. For example, respective sets of IP links used in data transfer and corresponding messaging could be associated with respective different ones of the routing modules.

The particular features described above in conjunction with FIG. 1 should not be construed as limiting in any way, and a wide variety of other system arrangements can be used to implement efficient timer mechanisms as disclosed herein.

The storage nodes 105 of the example distributed storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated hosts 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the hosts 101 and the storage nodes 105 to reside in different data centers. Numerous other distributed implementations of the storage nodes 105 and their respective associated sets of hosts 101 are possible.

Additional examples of processing platforms utilized to implement storage systems and possibly their associated hosts in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as hosts 101, distributed storage system 102, storage nodes 105, storage devices 106, storage processors 108 and instances of path selection logic 109 can be used in other embodiments.

It should therefore be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

Figure 2:
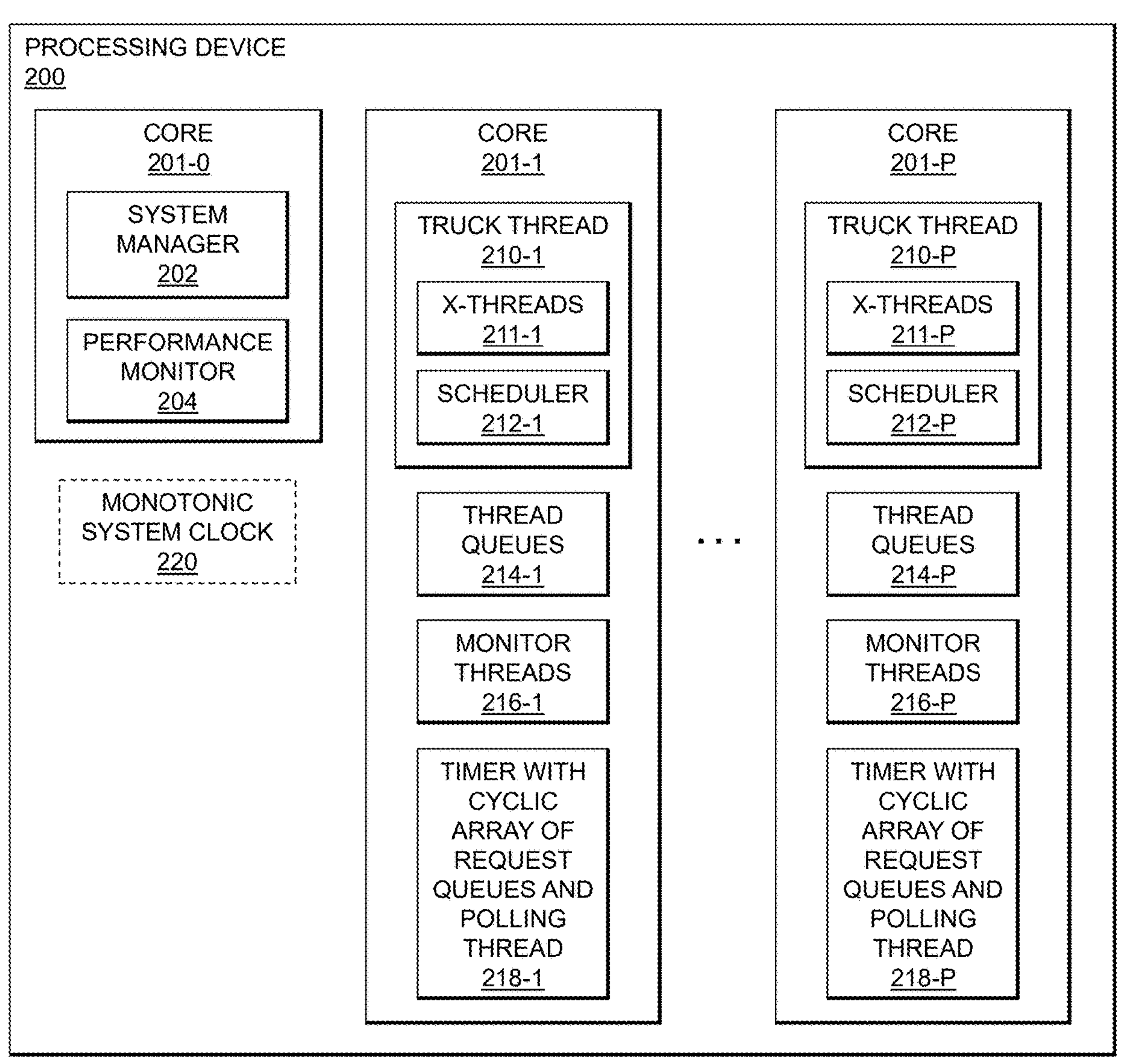
FIG. 2 is a block diagram of a processing device of the distributed storage system in the information processing system of FIG. 1, comprising a plurality of processing cores each having at least one timer implemented using a cyclic array of request queues and a polling thread in an illustrative embodiment.

Referring now to FIG. 2, a processing device 200 of a given one of the storage nodes 105 of the distributed storage system 102 comprises a multi-core processor including processing cores 201-0, 201-1, . . . 201-P. The processing core 201-0 implements a system manager 202 and a performance monitor 204. The other processing cores 201-1 through 201-P execute respective truck threads 210-1 through 210-P, comprising respective sets of multiple sub-threads illustratively in the form of X-threads 211-1 through 211-P. Other types of sub-threads can be used in other embodiments. Each of the processing cores 201-1 through 201-P also includes respective thread queues 214-1 through 214-P, respective monitor threads 216-1 through 216-P, and respective timers 218-1 through 218-P each comprising a cyclic array of request queues and a polling thread in an illustrative embodiment. The monitor threads 216 illustratively monitor the operation of other threads in the processing cores 201. The processing cores 201-1 through 201-P in some embodiments can also execute respective sets of one or more other application threads, which are not explicitly shown in the figure. These and other threads illustratively comprise operating system (OS) threads of their respective processing cores 201.

For example, in the case of a block-storage application, which handles the block-based storage functionality of the distributed storage system 102, the block-storage application executes truck threads 210 on respective ones of the processing cores 201 of the processing device 200. These truck threads 210 implement the block-storage application functionality. In some embodiments, each of the truck threads 210 may be hard affined to a particular one of the processing cores 201, such that it may only execute on that particular core.

The processing cores 201 in some embodiments illustratively comprise respective distinct central processing units (CPUs). Accordingly, instances of the processing device 200 in respective ones of the storage nodes 105 of distributed storage system 102 may be viewed as comprising a storage processor in the form of a multi-core CPU and an associated storage array comprising a set of storage devices 106, although numerous other arrangements are possible. The storage array or other arrangement of storage devices 106 associated with a given one of the storage nodes 105 may comprise, for example, a disk array enclosure (DAE), although such references herein to "disks" should not be construed as an indication that the storage devices are limited to HDDs or other rotating magnetic storage media.

The above-noted multi-core CPU illustratively runs the block-storage application on top of a preemptive OS, where a preemptive OS can preempt (e.g., stop) a running OS thread without its cooperation, and execute something else, such as another OS thread. The block-storage application is illustratively running a single hard-affined OS thread per each CPU core, which implements the block-storage functionality. This OS thread is an example of what is also referred to herein as a "truck thread." Truck threads and other application threads running on a given CPU core or other processing core are more generally referred to herein as "core threads" of that processing core.

As part of its operation, each of the truck threads 210 polls a corresponding set of interfaces of the distributed storage system 102 for tasks, events, or other data to be processed by that truck thread. For example, the set of interfaces may include an interface for indications of completions of submitted IO requests, an interface for IO requests from the user, and interfaces for other tasks, events, or other data. In some embodiments, the interface may include or be part of garbage collection processing or other removal of storage objects that have associated expiration times (e.g., storage objects associated with local snapshots, which may be asynchronously replicated from a source storage system to a target storage system and remain on the source storage system for a limited duration, storage objects for expired snapshots on a storage system, etc.). Any other interfaces may also be polled. Each truck thread, by design, fully utilizes the processing core that it is executing on for both interface polling and processing of the corresponding tasks, events, or other data. For example, in illustrative embodiments, each truck thread is designed to fully utilize the processing core that it is executing on because, even when there is no actual processing of tasks to be performed, the truck thread continues checking its respective interfaces via polling. This design is optimized for a storage system that requires low latency and high IO operations per second (IOPS) since no context switches or interrupts are required to perform the processing. In some embodiments, the functionality of the block-storage application may be described as an always-polling model.

In some embodiments, example interfaces that may be polled by a truck thread may include a front-end interface, an RPC messaging interface, an RDMA messaging interface, and a back-end interface. In some embodiments, any other interface commonly used in a storage system may also be polled by the truck thread. In some embodiments, each truck thread defines an IO-provider instance for each corresponding interface for which it is responsible for polling.

The front-end interface illustratively comprises an interface for receiving and replying to IO requests from users of the distributed storage system 102 associated with respective ones of the hosts 101. For example, a given truck thread may comprise a front-end IO-provider instance that polls for new IO requests from one or more hosts 101 or other system users. In some embodiments, for example, IO requests received by the distributed storage system 102 from the user are pooled together in a common pool that is shared between the truck threads 210 and accessed using a front-end IO-provider instance.

The RPC messaging interface illustratively comprises an interface for sending and receiving messages to and from other storage nodes 105 of the distributed storage system 102. For example, a given truck thread may comprise an RPC messaging IO-provider that polls for new messages from other storage nodes 105 in the distributed storage system 102. As an example, when one of the storage nodes 105 sends an IO request to another one of the storage nodes 105, the sender node selects the specific destination truck thread, that is, the truck thread that will receive and handle the request.

The RDMA messaging interface illustratively comprises an interface for RDMA transfer of buffers between storage nodes 105. For example, a given truck thread may comprise an RDMA messaging IO-provider that polls for the completion of RDMA transfers between storage nodes 105.

The back-end interface illustratively comprises an interface for accessing the storage devices 106 in order to write data to and read data from the storage devices 106. For example, a given truck thread may comprise a back-end IO-provider that polls for the completion of write and read requests initiated by the truck thread to one or more of the storage devices 106 of processing device 200.

In some cases, the distributed storage system 102 may also implement one or more other applications aside from the block-storage application. For example, a file-storage application that provides a file interface to a user of the information processing system 100 may also be implemented by the distributed storage system 102, for example, by executing corresponding threads on one or more of the processing cores 201. In some cases, the block-storage application and the file-storage application, or any other application, may be implemented by the distributed storage system 102 simultaneously, each with a different load that can dynamically change over time.

Since these applications are attempting to utilize the same set of processing cores 201 simultaneously, management of the available processing resources of these processing cores 201 between the applications can be challenging. For example, since the block-storage application is implemented by executing truck threads 210 on each of the processing cores 201 of each of the storage nodes 105, and these truck threads 210 can utilize the full capacity of those processing cores 201, little to no processing resources of the distributed storage system 102 may be available for use by threads of another application.

In some embodiments, if only the file-storage application is actively in use, such that no tasks, events, or other data are present for the truck threads 210 to process, the associated file threads may only be able to utilize a portion of the processing resources of a core, such as 50% or another percentage, where the remaining portion, such as the other 50% or another percentage, will be used by the truck threads 210 just for polling interfaces. In cases where the block-storage application is actively performing operations, the truck threads 210 will utilize a substantial portion of the processing resources of the cores, such as 90%, 95%, or even 100%, to both poll the interfaces and process any tasks, events, or other data found on those interfaces during the polling, which leaves little to no processing resources available on those cores for use by other applications such as a file-storage application.

The processing cores 201 of the FIG. 2 embodiment can therefore execute threads of multiple applications, including truck threads 210 and other application threads. For example, in some embodiments, a block-storage application is implemented by executing truck threads 210 on respective ones of the processing cores 201, with each of the truck threads 210 implementing a corresponding portion of the block-storage application. As described above, by executing truck threads 210 on respective processing cores 201, a significant portion of the processing resources of each of the processing cores 201 is utilized for polling interfaces associated with its corresponding truck thread, and processing associated tasks, events or other data found on those interfaces, leaving little to no processing resources available on that core for executing the threads of other applications.

Performance monitoring techniques are illustratively used in distributed storage system 102 to monitor the performance of core threads, such as the truck threads 210 executing on respective ones of the processing cores 201.

In some embodiments, the processing device 200 of the distributed storage system 102 is configured to implement performance monitoring functionality for core threads of the distributed storage system 102, such as the truck threads 210 that include respective schedulers 212.

The performance monitor 204 is configured to monitor performance of threads executing on the processing cores 201, such as truck threads 210 and other application threads. Such performance monitoring in illustrative embodiments involves collecting performance measurements from respective ones of the core threads, in some embodiments at least in part by utilizing one or more of the monitor threads 216.

For example, in the FIG. 2 embodiment, the truck thread 210-1 is assumed to be part of a block-storage application executing on the processing core 201-1. The truck thread 210-1 comprises a scheduler 212-1, illustratively configured to control switching between particular ones of the X-threads 211-1 of the truck thread 210-1. Such a scheduler can also control release of the processing core 201-1 by the truck thread 210-1 for use by at least one of the other application threads of a second application different than the block-storage application. In some embodiments, the second application comprises a file-storage application, although references herein to block-storage applications and file-storage applications are considered non-limiting examples.

The performance monitor 204 illustratively gathers such performance measurements from the truck thread 210-1 and from other ones of the truck threads 210 executing on respective other ones of the processing cores 201, and provides such measurements to the system manager 202 for use in controlling configuration of the processing device 200 and its processing cores 201 and their associated threads 210. Other embodiments can combine at least portions of system manager 202 and performance monitor 204 into a single component implemented on one or more processing cores 201 of the processing device 200.

As indicated above, the truck threads 210 run respective sets of X-threads 211. The X-threads 211 illustratively comprise respective lightweight threads that are scheduled by the schedulers 212 of the respective truck threads 210. For example, there may be thousands of X-threads 211 associated with each of the truck threads 210, with each of the X-threads 211 representing a specific flow or processing job (e.g., synchronous read/write, destage, RAID rebuild, defragmentation, garbage collection or other removal of expired storage objects and numerous others). The X-threads 211 in some embodiments are non-preemptive (e.g., cooperative), which means that one of the X-threads of a particular truck thread voluntarily gives up execution in order to allow another one of the X-threads of that truck thread to be scheduled. If an X-thread is doing a lengthy computational task (e.g., a task taking tens of microseconds), it should contain explicit yield and/or suspension calls, or implicit calls by waiting on synchronization objects.

It is assumed in some embodiments herein that each X-thread can be in one of multiple designated states at a particular point in time, including, for example, a running state, a ready state and a suspended state. In the running state, the X-thread is currently running. In the suspended state, the X-thread is waiting on a synchronization object (e.g., a lock, a semaphore, a timer, a barrier, a memory pool, a thread pool, etc.) In the ready state, the X-thread is ready to run, but waiting for the processing core (e.g., another X-thread is currently running).

The X-threads 211-1 are examples of what are more generally referred to herein as "sub-threads" of their corresponding truck thread 210-1. Other types of sub-threads having different arrangements of possible states can be used in other embodiments.

The X-threads 211-1 in some embodiments therefore comprise respective non-preemptive threads and the truck thread 210-1 is configured such that no X-thread in the running state is suspended to allow release of the processing core 201-1 by the truck thread 210-1 for use by the other application thread. Multiple suspensions of the truck thread 210-1 to allow the other application thread to execute may therefore each occur in conjunction with a switch between X-threads 211-1 of the truck thread 210-1.

In some embodiments, scheduler 212-1 of the truck thread 210-1 comprises a processing core release component and a waker component. The processing core release component is configured to determine, in conjunction with each switch between X-threads 211-1 of the truck thread 210-1, whether or not the truck thread 210-1 will suspend itself so as to release the processing core 201-1 for use by at least another application thread of the file-storage application. The processing core release component in some embodiments may be referred to as a CPU release component, as the processing cores such as processing cores 201 may comprise respective distinct CPUs of the processing device 200.

In some embodiments, the processing core release component of the truck thread 210-1 more particularly operates as follows. On every X-thread switch, a determination is made as to whether or not the truck thread 210-1 will give up execution, to allow other applications (e.g., a file-storage application) to run. When a truck thread suspends itself, it will resume execution when no other application is ready to run, or it will be rescheduled to run after a certain time by the waker component, whichever happens first.

The waker component is configured to determine, in conjunction with each switch between X-threads 211-1 of the truck thread 210-1, whether or not there is at least one additional thread of the block-storage application to be returned from suspension prior to release of the processing core 201-1 by the truck thread 210-1.

The waker component in some embodiments more particularly operates as follows. On every X-thread switch, and before the decision is made whether to give up the processing core, the waker component checks if there are currently one or more other truck threads of the block-storage application that are suspended and need to be awakened, and if so, it wakes up the one or more other truck threads.

The processing core release component therefore illustratively operates in conjunction with the waker component to suspend the truck thread 210-1 and to return the truck thread 210-1 from suspension. Other arrangements of additional or alternative components can be included in scheduler 212-1 in other embodiments.

Different ones of the X-threads 211-1 that are in the suspended state are illustratively enqueued in respective different ones of a plurality of thread queues 214-1, which is one set of the multiple sets of thread queues 214-1 through 214-P of the processing device 200, in order to wait for access to respective corresponding synchronization objects associated with resources of the processing core 201-1. The X-threads 211 of the other processing cores 201 may be similarly enqueued in the thread queues 214 of their respective processing cores 201 in order to wait for synchronization objects of those processing cores 201.

A given such synchronization object can include, for example, a lock. Other types of synchronization objects that can additionally or alternatively be implemented in distributed storage system 102 in illustrative embodiments herein include, for example, a semaphore, a barrier, a memory pool and/or a thread pool, or various combinations of these and other synchronization objects. The term "synchronization object" as used herein is intended to be broadly construed, so as to encompass, for example, various types of storage system resources that can be held by one thread to the exclusion of one or more other threads. Different synchronization objects are illustratively associated with different ones of the thread queues 214, in which threads waiting for those synchronization objects are enqueued. The timer 218-1 may also be viewed as providing a type of synchronization object within the processing core 201-1.

The timer 218-1 is illustratively configured to control requests for delayed execution of functions in the processing core 201-1 in accordance with respective delay times. For example, it can be used in some embodiments as a synchronization object configured to control execution of functions associated with one or more threads within the processing core 201-1. The timer 218-1 in this embodiment illustratively comprises a cyclic array of request queues, each configured to hold one or more of the requests, and a polling thread for polling the request queues to identify, for each of a plurality of polling intervals, a particular one of the requests to be processed from its corresponding one of the request queues. In some embodiments, the timer 218-1 is used for processing the removal of expired storage objects, where storage objects with different expiration times are placed in different "buckets" in a cyclic array. The different buckets may be associated with different time intervals, and storage objects with expiration times within the different time intervals may be placed in the buckets for those different time intervals (e.g., in the form of a bidirectional linked list). In each time interval, storage objects in the bucket for that time interval are processed. At the end of each time interval, the bucket associated with that time interval is "emptied" and then re-filled with storage objects (e.g., from an accumulator or dispenser bucket as described in further detail below) for a new time interval.

As will be described in more detail below, the timer 218-1 illustratively has access to a monotonic system clock 220. The monotonic system clock 220 is illustratively shown in dashed outline within the processing device 200, as it may be part of another system component, such as a system management node and/or an associated control plane server.

Each of the other processing cores 201, and their respective corresponding timers 218, are assumed to be configured in a manner similar to that described herein for processing core 201-1 and its timer 218-1.

An example process for implementing a timer in an illustrative embodiment, such as one of the timers 218 of a given one of the processing cores 201 of the processing device 200, will now be described. This process may be viewed as an example algorithm implemented at least in part by one or more processing cores of the storage nodes 105 of the distributed storage system 102. These and other algorithms for implementing timer mechanisms as disclosed herein can use other types and arrangements of system components in other embodiments. The process in some embodiments may be performed primarily by at least a given one of the processing cores 201 of a processing device 200 of one of the storage nodes 105 of the distributed storage system 102. Similar processes may be performed to provide additional instances of the timer in other processing cores of the same or other processing devices. The process includes implementing a timer for controlling requests for delayed execution of functions in accordance with respective delay times. The timer comprises a cyclic array of request queues, each configured to hold one or more of the requests, and a polling thread for polling the request queues to identify, for each of a plurality of polling intervals, one or more of the requests to be processed from its corresponding one of the request queues. Responsive to receipt of a given one of the requests, an array index is computed for the given request based at least in part on an expiration time of the given request and an initialization time of the timer, and the given request is assigned to a particular one of the request queues in accordance with the array index.

In some embodiments, the cyclic array of request queues is maintained, where every request queue in the array contains the requests that should execute within a fixed period of time in the future. When a new request is to be submitted, the appropriate array index, which identifies a particular queue in the cyclic array of request queues, is calculated. Once the request queue has been determined, the new request is submitted to that request queue. A polling thread executes in the background as a dedicated thread and runs selected expired requests, that is, requests that have reached their respective expiration times (e.g., storage objects which have reached their respective expiration times within a particular time interval associated with a bucket of storage objects with expiration times).

An example process for efficient handling of storage objects having associated expiration times in an illustrative embodiment will now be described with respect to the process flow of FIG. 3. This process may be viewed as an example algorithm implemented at least in part by one or more processing cores of the storage nodes 105 of the distributed storage system 102. These and other algorithms for efficient handling of storage objects having associated expiration times as disclosed herein can use other types and arrangements of system components in other embodiments.

Figure 3:
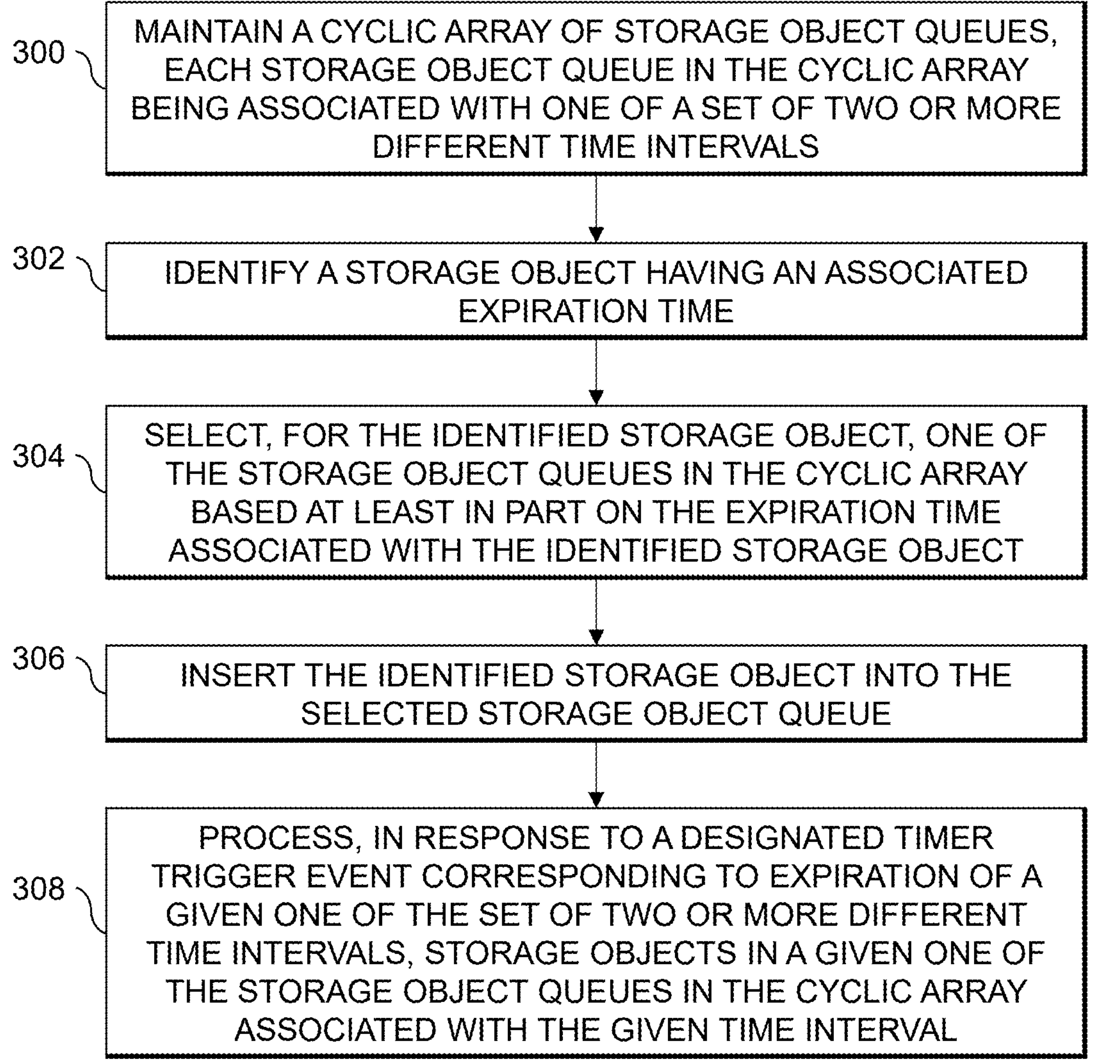
FIG. 3 is a flow diagram of an example process for efficient handling of storage objects having associated expiration times in an illustrative embodiment.

The process illustrated in FIG. 3 includes steps 300 through 308, and in some embodiments may be performed primarily by at least a given one of the processing cores 201 of a processing device 200 of one of the storage nodes 105 of the distributed storage system 102.

In step 300, a cyclic array of storage object queues is maintained. Each storage object queue in the cyclic array is associated with one of a set of two or more different time intervals (e.g., consecutive time intervals from a current time to a designated future time).

In step 302, a storage object having an associated expiration time is identified. The identified storage object may be associated with a snapshot, where the snapshot has the associated expiration time.

In step 304, one of the storage object queues in the cyclic array is selected for the identified storage object, based at least in part on the expiration time associated with the identified storage object.

In step 306, the identified storage object is inserted into the selected storage object queue. Inserting the identified storage object into the selected storage object queue may include inserting a node in the bidirectional linked list of the selected storage object queue.

In step 308, in response to a designated timer trigger event corresponding to expiration of a given one of the set of two or more different time intervals, storage objects in a given one of the storage object queues in the cyclic array associated with the given time interval are processed. The given storage object queue in the cyclic array may comprise a bidirectional linked list including a plurality of nodes, each of the plurality of nodes including (i) a reference to a storage object having an associated expiration time falling within the given time interval, (ii) a reference to a preceding node in the bidirectional linked list and (iii) a reference to a next node in the bidirectional linked list.

Processing the storage objects in the given storage object queue may include obtaining references to the storage objects in the given storage object queue from a plurality of nodes of a bidirectional linked list of the given storage object queue, and passing the obtained references to an expired storage object handling process. The FIG. 3 process may also include, responsive to the designated timer trigger event, removing the given time interval from the set of two or more different time intervals, adding a new time interval to the set of two or more different time intervals, and associating the given storage object queue with the new time interval. Removing the given time interval from the set of two or more different time intervals may include retrieving a bidirectional linked list of a plurality of nodes with references to storage objects expiring in the given time interval and seeing an anchor reference of the retrieved bidirectional linked list to a null value. Associating the given storage object queue with the new time interval comprises moving a head index of the given storage object queue to a bidirectional linked list of storage objects expiring in the new time interval.

In some embodiments, the FIG. 3 process includes removing a storage object from one of the storage object queues in the cyclic array by retrieving a reference for the storage object from a given node of the bidirectional linked list of said one of the storage object queues and removing the given node from the bidirectional linked list of said one of the storage object queues. The FIG. 3 process may also or alternatively include updating an expiration time associated with a storage object, wherein updating the expiration time associated with the storage object includes: retrieving a reference for the storage object from an existing node of a first bidirectional linked list of a first one of the storage object queues in the cyclic array; removing the existing node from the first bidirectional linked list; updating the expiration time associated with the storage object; selecting, based on the updated expiration time, a second one of the storage object queues in the cyclic array; and inserting a new node in a second bidirectional linked list of the second storage object queue.

The FIG. 3 process may further include maintaining an accumulator storage object queue for storage objects having associated expiration times outside a most distant time interval of the set of two or more different time intervals, maintaining a dispenser storage object queue and, responsive to an additional designated timer trigger event, to move storage objects in the accumulator storage object queue to the dispenser storage object queue, to scan storage objects in the dispenser storage object queue to determine if any of the storage objects in the dispenser storage object queue have associated expiration times falling within one of the set of two or more different time intervals, to move storage objects determined to have associated expiration times falling within one of the set of two or more different time intervals to the cyclic array of storage object queues, and to move storage objects not having associated expiration times falling within one of the set of two or more different time intervals to the accumulator storage object queue. The additional designated timer trigger event may be less than a length of each of the two or more different time intervals in the set of two or more different time intervals.

The steps of the FIG. 3 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 3 are therefore presented by way of illustrative example only, and should not be construed as limiting the scope of the disclosure in any way. Alternative embodiments can use other types of processing operations for implementing efficient timer mechanisms in a distributed storage system or other type of multi-threaded system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different timers in different processing cores.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

As mentioned previously, the efficient timer mechanisms disclosed herein in some embodiments are implemented in what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Hosts, storage processors and other system components may be implemented at least in part using processing devices of such processing platforms. For example, respective path selection logic instances and other related logic instances of the hosts and/or storage nodes can be implemented in respective containers running on respective ones of the processing devices of a processing platform.

Replicating data to remote locations is a task that may be performed by storage systems, such as for periodically copying snapshots as part of snapshot-based asynchronous replication processes (e.g., between a source storage system and a target or destination storage system). This data protection procedure may mandate that the local backup copies (e.g., snapshots) of storage volume data be protected in addition to the storage volume itself. These local backup copies (e.g., snapshots) can have variable, finite durations.

In a storage system that produces storage objects that are to be kept for a specified finite amount of time (e.g., storage objects which are part of snapshots), expiration times may be assigned to the storage objects. When the expiration time for a particular storage object has elapsed, the storage system should remove the expired storage object within a specified time interval, denoted $t_{int}$. Illustrative embodiments provide technical solutions for managing storage objects which are associated with expiration times, including management of storage objects in a "critical path" which includes operations such as adding new storage objects having associated expiration times, updating the expiration times of storage objects, and finding unhandled expired storage objects. Advantageously, the technical solutions described herein are able to perform such management of storage objects using techniques which may be performed in constant time (e.g., O(1) per storage object per operation).

Garbage collection processes may be used in some programming languages and storage systems to remove unnecessary storage objects automatically during runtime. For example, the JAVA garbage collector uses a scan-and-sweep approach to scan all relevant storage objects for a valid expiration condition, and then removes the expired storage objects. Such processing, however, cannot guarantee that it will run in a specified time interval (e.g., so as to timely remove all storage objects with expiration times falling in the specified time interval). Another approach for managing storage objects with time limits is to track the storage objects using a priority queue sorted by time limit. This approach uses different types of heap structures for a priority queue implementation that allows O(1) performance for some of the related operations. For other required operations, however, this approach demands O(log n) time for a single storage object, which means O(n*log n) for repeated operations like deleting minimum storage objects from the priority queue.

The technical solutions described herein utilize a database structure that allows for managing automated and user-defined storage volume snapshots with expiration times, without any restriction on maximal expiration time. Efficient mechanisms for tracking expired snapshots are crucial in storage systems to maintain optimal performance and resource utilization. Frequent creation and deletion of snapshots is integral to enforcing local protection policies and facilitating snapshot-based replication processes. Without a reliable method to identify and remove expired snapshots (and their associated storage objects), storage systems risk excessive resource consumption, degraded performance, and potential compliance issues. By automating the tracking and cleanup of expired snapshots and their associated storage objects, the technical solutions described herein ensure consistency, reduce administrative overhead, and maximize efficiency of storage systems. Advantageously, the technical solutions described herein are able to approach O(1) amortized time for all described operations, while using background processes to track storage objects without a performance impact on critical path operations.

Figure 4:
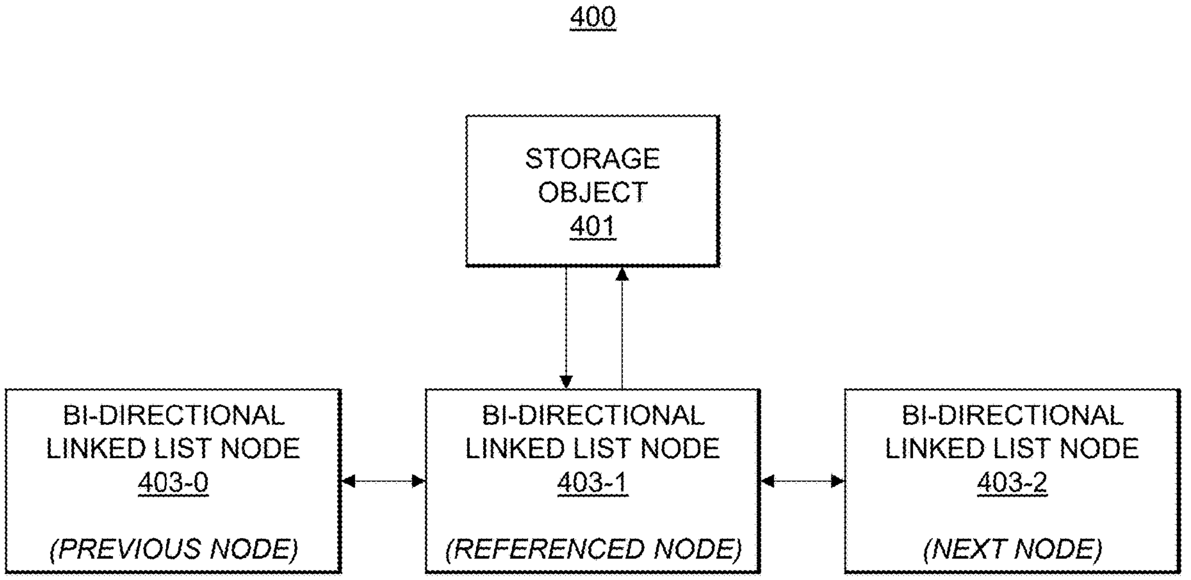
FIG. 4 shows a bidirectional linked list data structure in an illustrative embodiment.

In some embodiments, a storage system is configured, when generating a storage object, to include a reference to a bi-directional linked list node accessible at O(1) time. Therefore, operations to add a storage object, find a storage object, and remove a storage object from the bi-directional linked list will take only O(1) time. Each bi-directional linked list node will hold references to the next and previous node in the list, and includes a back reference to a storage object. A node can be either unlinked or linked to exactly one list. Using this structure will allow O(1) time consumption for operations of finding a storage object in a collection (e.g., a bi-directional linked list) and movement of a storage object to another collection (e.g., another bi-directional linked list). FIG. 4 shows an example of a portion of a bi-directional linked list 400, including a storage object 401 which includes a reference to a bi-directional linked list node 403-1 (also referred to as the "referenced node" for the storage object 401). The bi-directional linked list node 403-1 includes references to bi-directional linked list node 403-0 (also referred to as a "previous node" in the bi-directional linked list 400 relative to the referenced node for the storage object 401) and bi-directional linked list node 403-2 (also referred to as a "next node" in the bi-directional linked list 400 relative to the referenced node for the storage object 401).

Without loss of generality, a solution is provided for a storage system with resource limitations, such that it may be assumed that the storage system may maintain no more than $n_{max}$ storage objects at any given time. Let $t_{scan}$ be the time required for the storage system to perform an operation of removing an object node from a bi-directional linked list and adding the storage object to a node in another bi-directional linked list, for $n_{max}$ storage objects, and declare that $t_{max}=2*t_{scan}$.

In some embodiments, a bucket sort approach is used to sort storage objects with an expiration time between an interval from a current time to the current time plus $t_{max}$. Using k as the maximum number of intervals (e.g., $k=t_{max}/t_{int}$), a circular array is defined with k+1 elements referred to as buckets. Initially, at time to, each bucket will refer to a specific time interval $[t_0+(i-1)*t_{int}, t_0+(i)*t_{int}]$. Each bucket holds the anchor to a bi-directional linked list. An additional two separate bi-directional linked list anchors (e.g., an "accumulator" and a "dispenser") will serve as a throttle mechanism which will accumulate storage objects with an expiration time out of range for the bucket sort, and bring them to it once they become in range to be placed in the previously described buckets.

In the event of adding a new storage object with an expiration time, the following formula is used to calculate the index of the bucket holding the anchor to the bi-directional linked list to which the storage object should be added:

$$\text{index} = \text{floor}((t_{exp} - t_{current})/t_{int}) + 1, \text{ if } t_{exp} \text{ is less than } t_{current} + t_{max} + t_{int}$$

where $t_{exp}$ is the expiration time of the storage object being added. If a storage object's expiration time falls outside of the time intervals defined for the buckets in the array, the storage object is added to the "accumulator" linked list.

Figure 5A:
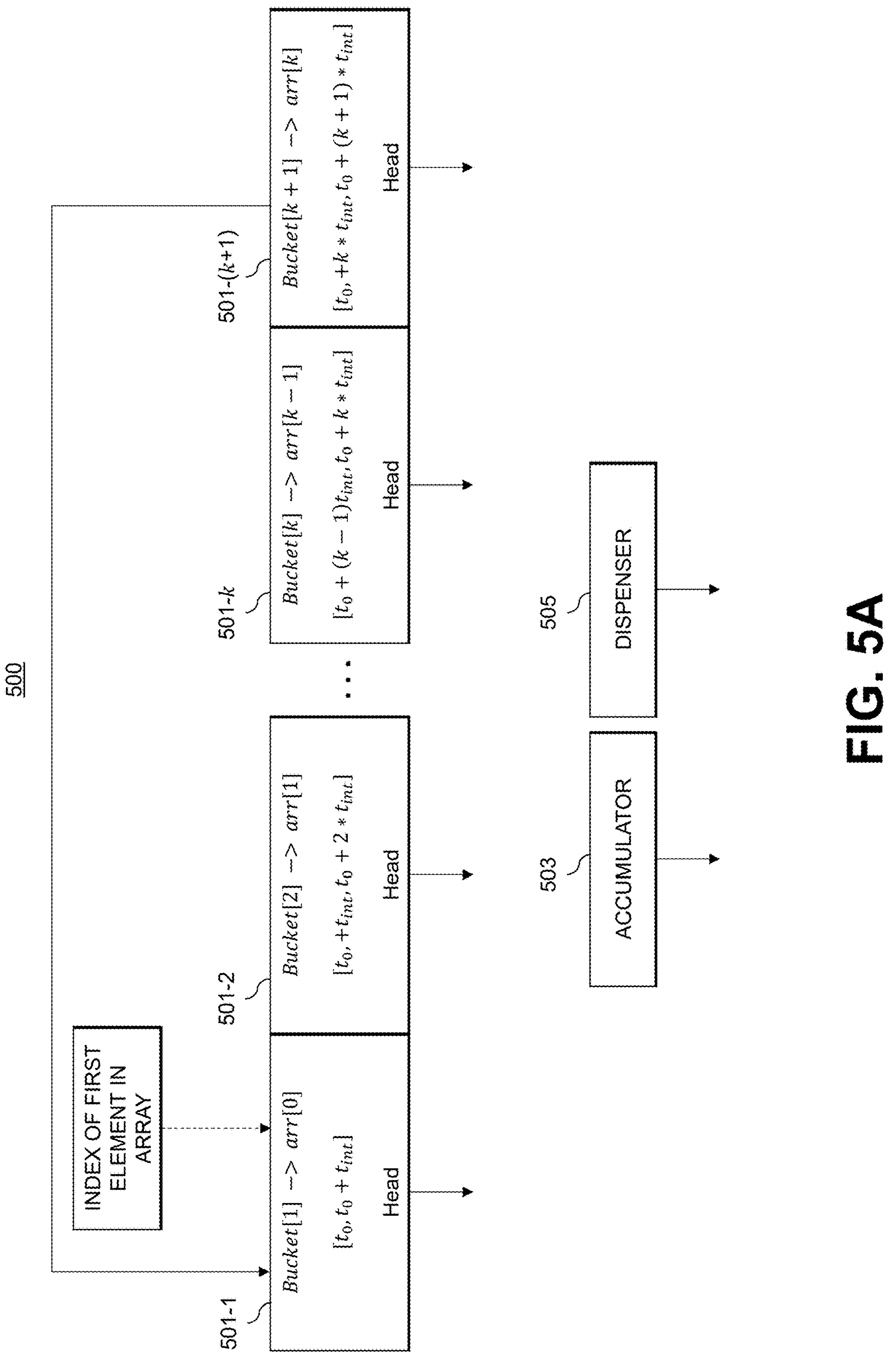
FIGS. 5A and 5B show respective examples of bucket configurations of a cyclic array of bidirectional linked lists of storage objects with expiration times in an illustrative embodiment.

FIG. 5A shows a bucket array 500, including a set of buckets 501-1, 501-2, . . . 501-*k*, 501-(k+1) (collectively, buckets 501), along with an accumulator bucket 503 and a dispenser bucket 505. Each of the buckets 501 is associated with a particular time interval, e.g., bucket 501-1 is the first bucket (bucket[1]) associated with time interval $[t_0, t_0+t_{int}]$ having the index of the first element in the bucket array 500, bucket 501-2 is the second bucket (bucket[2]) associated with time interval $[t_0+t_{int}, t_0+2*t_{int}]$, bucket 501-*k* is the kth bucket (bucket[k]) associated with time interval $[t_0+(k-1) t_{int}, t_0+k*t_{int}]$, and bucket 501-(k+1) is the (k+1)th bucket (bucket[k+1]) associated with time interval $[t_0+k*t_{int}, t_0+(k+1)*t_{int}]$.

Various operations may be performed for the bucket array 500, including inserting a storage object, removing a storage object, updating a storage object, and extracting an expired storage object. The runtime of inserting a storage object is O(1), because calculating the bucket index of O(1) and inserting the object's node in the relevant linked list is also O(1). The runtime of removing a storage object is also O(1), because the storage object's reference can be retrieved from the linked list node. Updating a storage object's expiration time will have three parts: (i) removing the storage object from its current linked list, (ii) updating the expiration time of the storage object, and (iii) inserting the storage object into the appropriate linked list. As described above, these operations have a runtime of O(1), so the update also has a runtime of O(1).

A timer is used to control the periodic removal of expired objects each time interval $t_{int}$. This process includes the following steps:

1. Get a reference to the linked list of nodes with references to expired storage objects from bucket[1], and pass it to a specified procedure to handle these storage objects.
2. Set bucket[1] linked list anchor reference to NULL.
3. Move the bucket array head index to refer to the next bucket in the cyclic array. This will logically updated bucket indices in the circular array so the bucket used (at Steps 1 and 2) will get the index k+1, and will be used to hold objects for a new time interval $[t+(k)*t_{int}, t+(k+1)*t_{int}]$ the same as $[t+t_{max}, t+t_{max}+t_{int}]$.

Figure 5B:
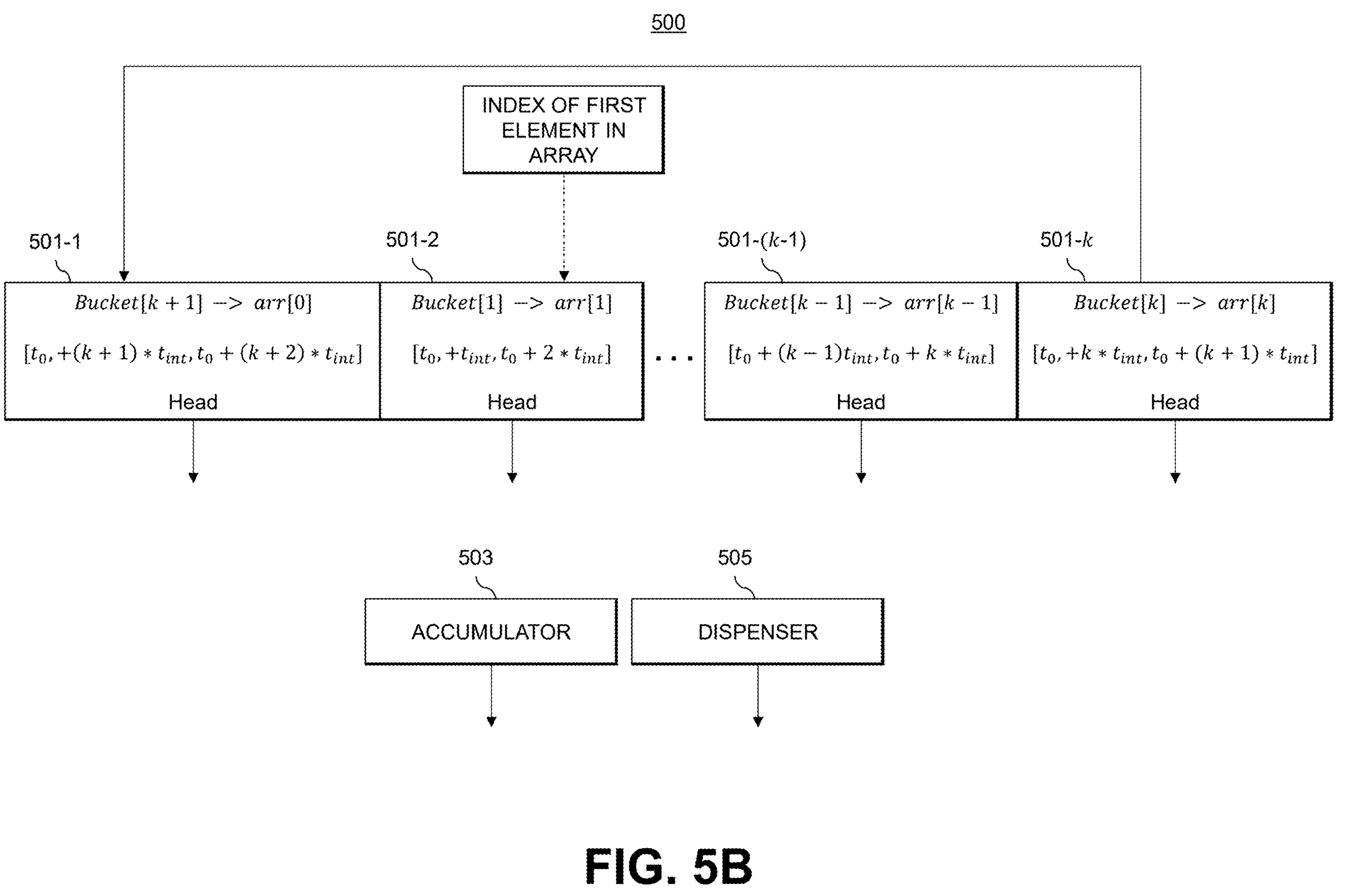

Therefore, the time required to retrieve all recently expired objects is O(1) (e.g., Step 1 in the procedure above). FIG. 5B shows the bucket array 500, representing the state after the first timer trigger event after to. As illustrated, the bucket 501-2 associated with the interval $[to, +t_{int}, t_0+2*t_{int}]$ is updated to be the first bucket (bucket[1]) having the index of the first element in the bucket array 500. The bucket 501-1 (which previously held the storage objects with an expiration time in the interval $[to, t_0+t_{int}]$), is updated to be the (k+1)th bucket associated with the interval $[t_0, +(k+1)*t_{int}, t_0+(k+2)*t_{int}]$. Other ones of the buckets 501 are updated accordingly as illustrated. The generalization of the diagram shown in FIG. 5B shows that the structure remains valid after the timer event, because the new interval associated with the new bucket (bucket[k+1]) is adjoint to the "old"

bucket 501-*k* (which previously was associated with bucket [k+1], and is updated to be associated with bucket[k]) without gaps.

On each k/2 timer event (e.g., where $k=t_{max}/t_{int}=2*t_{scan}/t_{int}$), the roles of the accumulator bucket 503 and dispenser bucket 505 anchors are switched, and all storage objects in the bi-directional linked list of the dispenser bucket 505 are scanned. In case a storage object in the dispenser bucket 505 has an expiration time that is covered by one of the buckets 501, that storage object is moved to the bi-directional linked list of the relevant one of the buckets 501. Otherwise, the storage object is moved to the bi-directional linked list of the accumulator bucket 503. Due to the definition of $t_{scan}$, the procedure will finish the scan and move all storage objects from the bi-directional linked list of the dispenser bucket 505 until the next k/2 timer event. Since all storage objects placed in the bi-directional linked list of the accumulator bucket 503 have an expiration time greater than $t_{current}+t_{max}$ ($t_{current}+2*t_{scan}$), after k/2 timer events the minimal expiration time for a storage objects in this list will be at least $t_{current,new}+t_{scan}$, (where $t_{current,new}$ is the new current time,) meaning that such storage objects have not expired yet.

In some embodiments, further optimizations can be achieved by repeatedly applying the same technique to the storage objects in the accumulator and dispenser queues. This can be done by using an additional set of buckets with a larger interval time (e.g., $t_{int,new}=k/2*t_{int}$). This approach will efficiently sort and detect storage objects that need to be moved from the accumulator and dispenser queues, thereby reducing the number of storage objects that remain in the unsorted reduced accumulator and dispenser queues. These remaining storage objects do not fit within the time intervals of the additional buckets, but will practically present an insignificant percentage of total storage objects in the storage system.

The technical solutions described herein enable operations to insert, update and remove storage objects with expiration times to be performed at O(1) time. The extraction of all storage objects expired within the time interval $t_{int}$ takes O(1) time to get a linked list. The time to scan objects in this linked list is O(n), which means O(1) per storage object. The background process to manage this structure does not have a direct impact on these operations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for efficient handling of storage objects having associated expiration times will now be described in greater detail with reference to FIGS. 6 and 7. Although described in the context of system 100, these platforms may also be used to implement at least portions of other information processing systems in other embodiments.

Figure 6:
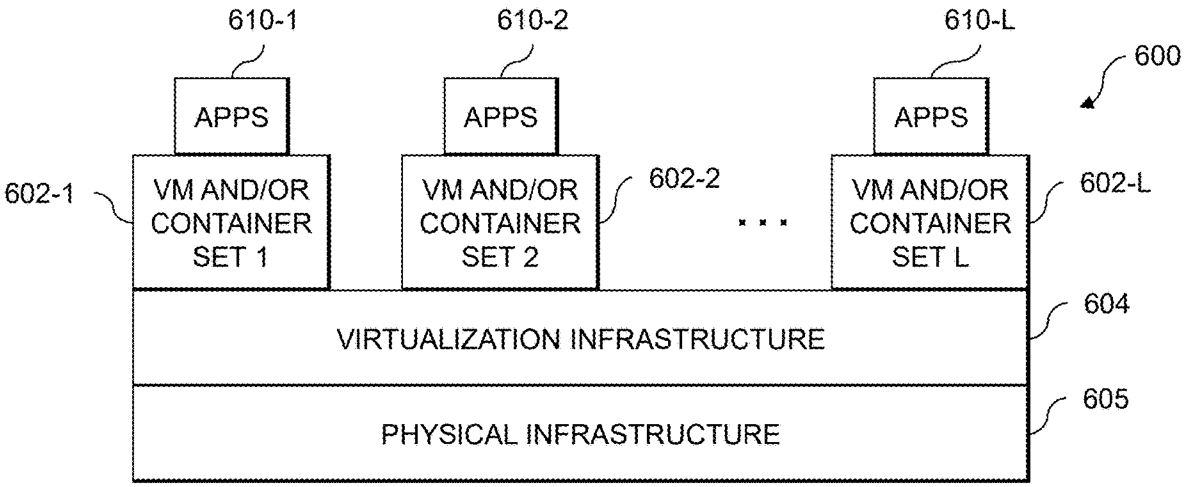
FIGS. 6 and 7 show examples of processing platforms that may be utilized to implement at least a portion of an information processing system in illustrative embodiments.
Figure 7:
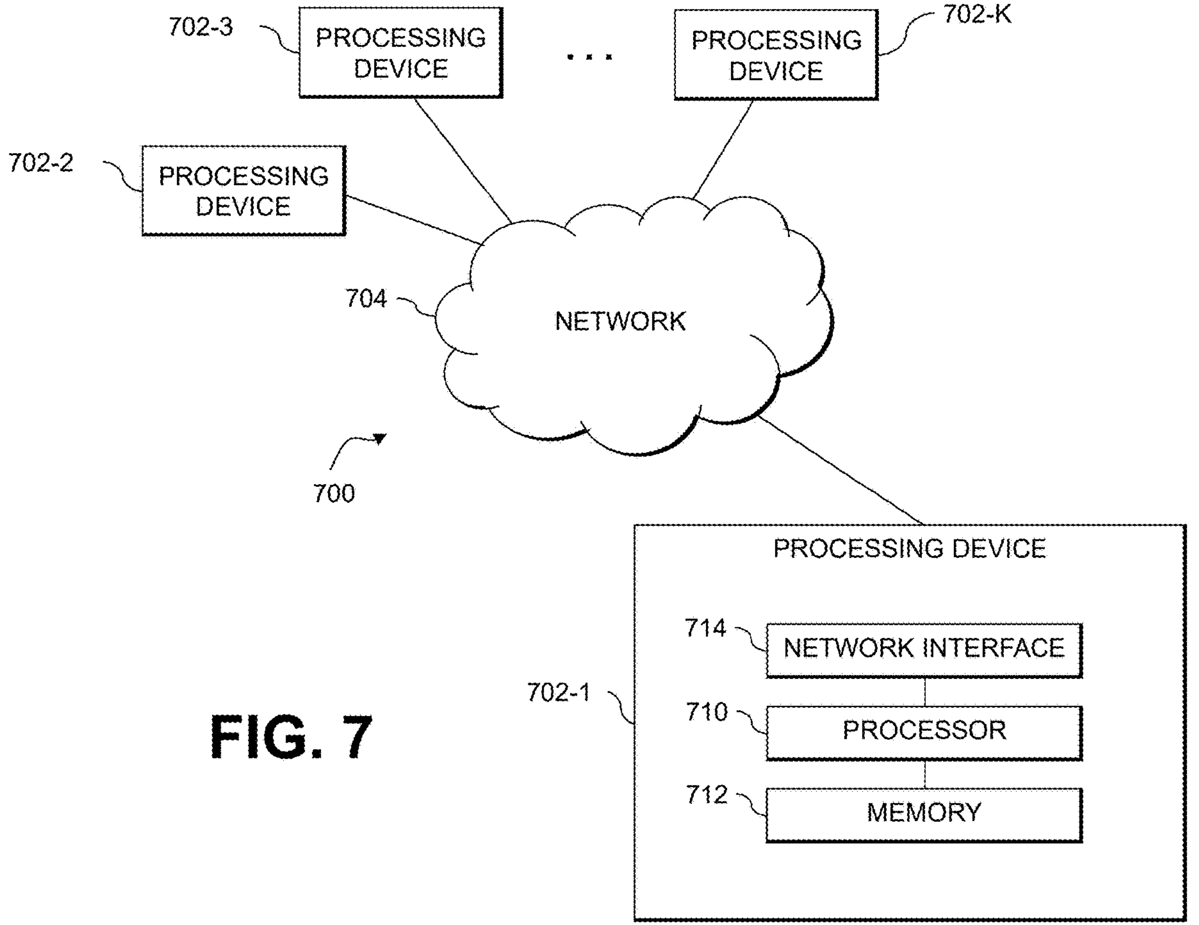

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU), a neural processing unit (NPU), a data processing unit (DPU), a System-On-Chip (SOC) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for efficient handling of storage objects having associated expiration times as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to maintain a plurality of storage object queues, the plurality of storage object queues comprising (i) a cyclic array of storage object queues, each storage object queue in the cyclic array being associated with one of a set of two or more different time intervals, and (ii) at least one additional storage object queue for storage objects having associated expiration times outside of the set of two or more different time intervals;

to identify a storage object having an associated expiration time;

to select, for the identified storage object, one of the plurality of storage object queues based at least in part on the expiration time associated with the identified storage object;

to insert the identified storage object into the selected storage object queue;

to process, in response to a designated timer trigger event corresponding to expiration of a given one of the set of two or more different time intervals, storage objects in a given one of the storage object queues in the cyclic array associated with the given time interval; and to process, in response to an additional designated timer trigger event, storage objects in the at least one additional storage object queue, the additional designated timer trigger event being triggered prior to the expiration of the given time interval associated with the given storage object queue.

2. The apparatus of claim 1 wherein the identified storage object is associated with a snapshot, the snapshot having the associated expiration time.

3. The apparatus of claim 1 wherein the given storage object queue in the cyclic array comprises a bidirectional linked list including a plurality of nodes, each of the plurality of nodes including (i) a reference to a storage object having an associated expiration time falling within the given time interval, (ii) a reference to a preceding node in the bidirectional linked list and (iii) a reference to a next node in the bidirectional linked list.

4. The apparatus of claim 1 wherein inserting the identified storage object into the selected storage object queue comprises inserting a node in a bidirectional linked list of the selected storage object queue.

5. The apparatus of claim 1 wherein the at least one processing device is configured to remove a storage object from one of the storage object queues in the cyclic array by retrieving a reference for the storage object from a given node of a bidirectional linked list of said one of the storage object queues and removing the given node from the bidirectional linked list of said one of the storage object queues.

6. The apparatus of claim 1 wherein the at least one processing device is further configured to update an expiration time associated with a storage object in a first one of the storage object queues in the cyclic array, wherein updating the expiration time associated with the storage object comprises:

retrieving a reference for the storage object from an existing node of a first bidirectional linked list of the first storage object queue;

removing the existing node from the first bidirectional linked list;

updating the expiration time associated with the storage object;

selecting, based on the updated expiration time, a second one of the storage object queues in the cyclic array; and inserting a new node in a second bidirectional linked list of the second storage object queue.

7. The apparatus of claim 1 wherein processing the storage objects in the given storage object queue comprises:

obtaining references to the storage objects in the given storage object queue from a plurality of nodes of a bidirectional linked list of the given storage object queue; and passing the obtained references to an expired storage object handling process.

8. The apparatus of claim 1 wherein the at least one additional storage object queue comprises an accumulator storage object queue for the storage objects having associated expiration times outside of the set of two or more different time intervals.

9. The apparatus of claim 8 wherein the at least one additional storage object queue further comprises a dispenser storage object queue, and wherein responsive to the additional designated timer trigger event, the at least one processing device is configured to move storage objects in the accumulator storage object queue to the dispenser storage object queue.

10. The apparatus of claim 9 wherein the at least one processing device is further configured:

to scan storage objects in the dispenser storage object queue to determine if any of the storage objects in the dispenser storage object queue have associated expiration times falling within one of the set of two or more different time intervals;

to move storage objects determined to have associated expiration times falling within one of the set of two or more different time intervals to the cyclic array of storage object queues; and to move storage objects not having associated expiration times falling within one of the set of two or more different time intervals to the accumulator storage object queue.

11. The apparatus of claim 9 wherein the additional designated timer trigger event is repeated prior to an end of each of the two or more different time intervals in the set of two or more different time intervals.

12. The apparatus of claim 1 wherein the at least one processing device is further configured, responsive to the designated timer trigger event:

to remove the given time interval from the set of two or more different time intervals;

to add a new time interval to the set of two or more different time intervals; and to associate the given storage object queue with the new time interval.

13. The apparatus of claim 12 wherein removing the given time interval from the set of two or more different time intervals comprises retrieving a bidirectional linked list of a plurality of nodes with references to storage objects expiring in the given time interval and setting an anchor reference of the retrieved bidirectional linked list to a null value.

14. The apparatus of claim 13 wherein associating the given storage object queue with the new time interval comprises moving a head index of the given storage object queue to a bidirectional linked list of storage objects expiring in the new time interval.

15. A computer program product comprising a non-transitory processor-readable storage medium having stored therein program code of one or more software programs, wherein the program code when executed by at least one processing device comprising a processor coupled to a memory, causes the at least one processing device:

to maintain a plurality of storage object queues, the plurality of storage object queues comprising (i) a cyclic array of storage object queues, each storage object queue in the cyclic array being associated with one of a set of two or more different time intervals, and (ii) at least one additional storage object queue for storage objects having associated expiration times outside of the set of two or more different time intervals;

to identify a storage object having an associated expiration time;

to select, for the identified storage object, one of the plurality of storage object queues based at least in part on the expiration time associated with the identified storage object;

to insert the identified storage object into the selected storage object queue;

to process, in response to a designated timer trigger event corresponding to expiration of a given one of the set of two or more different time intervals, storage objects in a given one of the storage object queues in the cyclic array associated with the given time interval; and to process, in response to an additional designated timer trigger event, storage objects in the at least one additional storage object queue, the additional designated timer trigger event being triggered prior to the expiration of the given time interval associated with the given storage object queue.

16. The computer program product of claim 15 wherein the identified storage object is associated with a snapshot, the snapshot having the associated expiration time.

17. The computer program product of claim 15 wherein the given storage object queue in the cyclic array comprises a bidirectional linked list including a plurality of nodes, each of the plurality of nodes including (i) a reference to a storage object having an associated expiration time falling within the given time interval, (ii) a reference to a preceding node in the bidirectional linked list and (iii) a reference to a next node in the bidirectional linked list.

18. A method comprising:

maintaining a plurality of storage object queues, the plurality of storage object queues comprising (i) a cyclic array of storage object queues, each storage object queue in the cyclic array being associated with one of a set of two or more different time intervals, and (ii) at least one additional storage object queue for storage objects having associated expiration times outside of the set of two or more different time intervals;

identifying a storage object having an associated expiration time;

selecting, for the identified storage object, one of the plurality of storage object queues based at least in part on the expiration time associated with the identified storage object;

inserting the identified storage object into the selected storage object queue; and processing, in response to a designated timer trigger event corresponding to expiration of a given one of the set of two or more different time intervals, storage objects in a given one of the storage object queues in the cyclic array associated with the given time interval; and processing, in response to an additional designated timer trigger event, storage objects in the at least one additional storage object queue, the additional designated timer trigger event being triggered prior to the expiration of the given time interval associated with the given storage object queue;

wherein the method is performed by at least one processing device comprising a processor coupled to a memory.

19. The method of claim 18 wherein the identified storage object is associated with a snapshot, the snapshot having the associated expiration time.

20. The method of claim 18 wherein the given storage object queue in the cyclic array comprises a bidirectional linked list including a plurality of nodes, each of the plurality of nodes including (i) a reference to a storage object having an associated expiration time falling within the given time interval, (ii) a reference to a preceding node in the bidirectional linked list and (iii) a reference to a next node in the bidirectional linked list.

* * * * *